United States Patent
Saur et al.

(10) Patent No.: US 8,037,549 B2
(45) Date of Patent: Oct. 18, 2011

(54) REINFORCING ELEMENT

(75) Inventors: Erwin Friedrich Saur, Schwabach-Wolkersdorf (DE); Joerg Knappworst, Oberasbach (DE)

(73) Assignee: adidas International Marketing B.V., Amsterdam (NL)

( * ) Notice: Subject to any disclaimer, the term of this patent is extended or adjusted under 35 U.S.C. 154(b) by 623 days.

(21) Appl. No.: 10/973,095

(22) Filed: Oct. 25, 2004

(65) Prior Publication Data

US 2005/0153153 A1  Jul. 14, 2005

(30) Foreign Application Priority Data

Oct. 30, 2003  (DE) .................................. 103 50 448

(51) Int. Cl.
 *A41D 13/00* (2006.01)
(52) U.S. Cl. ............................................ 2/455
(58) Field of Classification Search ........................ None
See application file for complete search history.

(56) References Cited

U.S. PATENT DOCUMENTS

| | | | |
|---|---|---|---|
| 991,036 A | 5/1911 | Spiegelman |
| 1,586,698 A | 6/1926 | Posner |
| 1,951,190 A | 3/1934 | Gambee |
| 2,251,551 A | 8/1941 | O'Reilly |
| 2,302,694 A | 11/1942 | Jennings |
| 3,707,730 A | 1/1973 | Slider |
| 3,732,575 A | 5/1973 | Pakulak |
| 3,838,853 A | 10/1974 | Fredenhagen |
| 4,051,553 A | 10/1977 | Howard |
| 4,187,620 A | 2/1980 | Selner |
| 4,253,660 A | 3/1981 | Tiktin |
| 4,272,849 A | 6/1981 | Thurston et al. |
| 4,354,280 A | 10/1982 | Hayes |
| 4,366,634 A | 1/1983 | Giese et al. |
| 4,368,883 A | 1/1983 | Tiktin |
| RE31,538 E | 3/1984 | Antonious |
| 4,441,213 A | 4/1984 | Trumble et al. |
| 4,489,716 A | 12/1984 | Blackwood et al. |
| 4,507,804 A | 4/1985 | Consigny |
| 4,524,464 A | 6/1985 | Primiano et al. |
| 4,561,122 A | 12/1985 | Stanley et al. |
| 4,565,195 A | 1/1986 | Eisenberg |
| 4,570,269 A | 2/1986 | Berlese |
| 4,663,783 A | 5/1987 | Obayashi |

(Continued)

FOREIGN PATENT DOCUMENTS

CH  577 328  7/1976

(Continued)

OTHER PUBLICATIONS

Five photographs of a reinforcing element utilized in adidas "Fingersave Glove" (Ref. Cl) (components partially separated).

(Continued)

*Primary Examiner* — Tejash Patel
(74) *Attorney, Agent, or Firm* — Kilpatrick Townsend & Stockton LLP

(57) ABSTRACT

A reinforcing element for an article of clothing includes at least one elongate element and a plurality of raised bodies aligned substantially longitudinally and integrally formed with the elongate element. The bodies define slits therebetween to allow bending of the reinforcing element in a first direction and prevent bending of the reinforcing element in a second direction by a blocking contact of the bodies.

19 Claims, 6 Drawing Sheets

U.S. PATENT DOCUMENTS

| | | | |
|---|---|---|---|
| 4,680,812 A * | 7/1987 | Weigl | 2/467 |
| 4,691,387 A | 9/1987 | Lopez | |
| 4,698,851 A | 10/1987 | Dunford et al. | |
| 4,738,447 A | 4/1988 | Brown | |
| 4,742,579 A | 5/1988 | Dunford | |
| 4,766,612 A | 8/1988 | Patton, Sr. | |
| 4,776,111 A | 10/1988 | Crowley | |
| 4,779,289 A | 10/1988 | Prouty | |
| 4,787,376 A | 11/1988 | Eisenberg | |
| 4,815,147 A | 3/1989 | Gazzano et al. | |
| 4,864,659 A | 9/1989 | Morris | |
| 4,865,023 A | 9/1989 | Craythorne et al. | |
| 4,884,561 A | 12/1989 | Letson, Sr. | |
| 4,911,433 A | 3/1990 | Walker et al. | |
| 4,922,630 A | 5/1990 | Robinson | |
| 4,930,162 A | 6/1990 | Côté | |
| 4,958,384 A | 9/1990 | McCrane | |
| 4,995,119 A | 2/1991 | Codkind | |
| 4,999,847 A | 3/1991 | Barcelo | |
| 5,018,221 A | 5/1991 | Romandetto | |
| 5,033,119 A | 7/1991 | Wiggins | |
| 5,050,319 A | 9/1991 | Perotto et al. | |
| 5,056,509 A | 10/1991 | Swearington | |
| 5,067,175 A | 11/1991 | Gold | |
| 5,078,128 A | 1/1992 | Grim et al. | |
| 5,083,314 A | 1/1992 | Andujar | |
| D323,910 S | 2/1992 | Pierce, Jr. | |
| 5,107,544 A | 4/1992 | Capatosto | |
| 5,125,171 A | 6/1992 | Stewart | |
| 5,133,775 A | 7/1992 | Chen | |
| 5,136,725 A | 8/1992 | Montero | |
| 5,140,995 A | 8/1992 | Uhl | |
| 5,152,082 A | 10/1992 | Culpepper | |
| 5,175,947 A | 1/1993 | Parracho | |
| 5,222,256 A | 6/1993 | Wang | |
| 5,257,418 A | 11/1993 | Jaskiewicz | |
| 5,267,677 A | 12/1993 | Nash | |
| 5,295,269 A | 3/1994 | Ballard | |
| 5,307,521 A | 5/1994 | Davis | |
| 5,330,391 A | 7/1994 | Mitchell | |
| 5,358,469 A | 10/1994 | Patchel et al. | |
| 5,456,650 A | 10/1995 | Williams, Jr. et al. | |
| 5,486,157 A | 1/1996 | DiBenedetto | |
| 5,511,242 A | 4/1996 | Bianchi | |
| 5,511,243 A | 4/1996 | Hall et al. | |
| 5,551,083 A | 9/1996 | Goldsmith | |
| 5,557,803 A | 9/1996 | Granich et al. | |
| 5,594,954 A | 1/1997 | Huang | |
| 5,628,069 A | 5/1997 | Ebert | |
| 5,640,712 A | 6/1997 | Hansen et al. | |
| 5,741,222 A | 4/1998 | Fiore | |
| 5,758,365 A | 6/1998 | Steeley | |
| 5,768,710 A | 6/1998 | Williams | |
| 5,768,717 A | 6/1998 | Le Sueur et al. | |
| 5,774,896 A | 7/1998 | Hochmuth | |
| 5,774,897 A | 7/1998 | Hochmuth | |
| 5,792,087 A | 8/1998 | Pringle | |
| 5,799,659 A | 9/1998 | Stano | |
| 5,802,614 A | 9/1998 | Melone, Jr. | |
| 5,809,571 A | 9/1998 | Spitzer | |
| 5,810,754 A | 9/1998 | Kenosh | |
| 5,815,838 A | 10/1998 | Lord et al. | |
| 5,848,440 A | 12/1998 | Pajorola | |
| 5,881,385 A | 3/1999 | Hochmuth | |
| 5,884,329 A | 3/1999 | Goldsmith et al. | |
| 5,894,684 A | 4/1999 | Sand et al. | |
| 5,896,683 A | 4/1999 | Foxen et al. | |
| 5,898,943 A | 5/1999 | Kim | |
| 5,933,868 A | 8/1999 | Bender | |
| 5,937,444 A | 8/1999 | Hochmuth | |
| 5,946,720 A | 9/1999 | Sauriol | |
| 5,963,985 A | 10/1999 | Behr et al. | |
| 5,974,588 A | 11/1999 | Furman | |
| 5,983,396 A | 11/1999 | Morrow et al. | |
| 6,012,170 A | 1/2000 | Kim | |
| 6,024,712 A | 2/2000 | Iglesias et al. | |
| 6,029,376 A | 2/2000 | Cass | |
| 6,083,184 A | 7/2000 | Kenosh | |
| 6,088,835 A | 7/2000 | Perkins et al. | |
| 6,112,434 A | 9/2000 | Seltzer et al. | |
| 6,119,271 A | 9/2000 | Byon | |
| D436,148 S | 1/2001 | Villepigue | |
| 6,223,350 B1 | 5/2001 | McFarlane | |
| 6,279,163 B1 | 8/2001 | Hale et al. | |
| 6,342,043 B1 | 1/2002 | Gottsmann et al. | |
| D454,231 S | 3/2002 | McFarlane | |
| 6,415,443 B1 | 7/2002 | Schierenbeck et al. | |
| 6,427,695 B1 | 8/2002 | Zanetti et al. | |
| 6,557,177 B2 * | 5/2003 | Hochmuth | 2/159 |
| 6,687,920 B2 | 2/2004 | Berns | |
| 6,715,218 B2 | 4/2004 | Johnson | |
| 6,725,466 B2 | 4/2004 | Hochmuth | |
| D504,981 S | 5/2005 | Vanderhoef | |
| 6,918,137 B2 | 7/2005 | Fowler | |
| D521,644 S | 5/2006 | Nordt et al. | |
| 7,143,447 B2 * | 12/2006 | Fleischmann | 2/16 |
| 7,293,296 B1 * | 11/2007 | Beraznik et al. | 2/161.1 |
| 7,313,831 B2 | 1/2008 | Wilder et al. | |
| 7,320,145 B2 | 1/2008 | Hochmuth | |
| 7,329,230 B2 * | 2/2008 | Mazzarolo | 602/19 |
| 7,451,493 B2 | 11/2008 | Godshaw | |
| 2002/0073477 A1 | 6/2002 | Hochmuth | |
| 2002/0184696 A1 | 12/2002 | Hochmuth | |
| 2004/0148675 A1 | 8/2004 | Powell | |
| 2005/0114982 A1 | 6/2005 | Gremmert | |
| 2006/0026738 A1 | 2/2006 | Kleinert | |
| 2006/0048259 A1 | 3/2006 | Keppler et al. | |
| 2006/0253951 A1 | 11/2006 | Mueller et al. | |
| 2007/0028354 A1 | 2/2007 | Hochmuth | |
| 2007/0226866 A1 | 10/2007 | Geyer et al. | |
| 2007/0261149 A1 | 11/2007 | Gait | |
| 2008/0263745 A1 | 10/2008 | Grilliot et al. | |
| 2008/0271219 A1 | 11/2008 | Homer | |
| 2009/0172864 A1 | 7/2009 | Fisher et al. | |
| 2009/0222967 A1 | 9/2009 | Winningham et al. | |

FOREIGN PATENT DOCUMENTS

| | | |
|---|---|---|
| DE | 2853154 | 8/1980 |
| DE | 35 16 545 C2 | 5/1985 |
| DE | 87 08 682.4 | 9/1987 |
| DE | 37 25 516 C2 | 9/1988 |
| DE | 37 38 005 A1 | 5/1989 |
| DE | 89 10 050.6 | 12/1989 |
| DE | 8910050.6 | 12/1989 |
| DE | 297 05 586 U1 | 8/1998 |
| DE | 298 08 682 U1 | 9/1999 |
| DE | 29916217 | 5/2000 |
| DE | 199 10 799 C1 | 8/2000 |
| DE | 100 10 403 A1 | 9/2001 |
| DE | 100 10 404 A1 | 9/2001 |
| DE | 201 13 431 U1 | 2/2002 |
| DE | 101 00 848 C1 | 8/2002 |
| DE | 201 07 098 U1 | 10/2002 |
| DE | 87 06 816.8 | 8/2007 |
| EP | 0 083 454 | 7/1983 |
| HU | 24401/99 | 6/1999 |
| JP | 09262332 | 10/1997 |
| WO | WO 99/23981 | 5/1999 |
| WO | WO 00/53275 | 9/2000 |
| WO | WO 01/00052 | 1/2001 |

OTHER PUBLICATIONS

Three photos of adidas, "Fingersave Glove".
Opposition request filed in corresponding European Patent No. EP 1 527 802 B1, 6 pages.

* cited by examiner

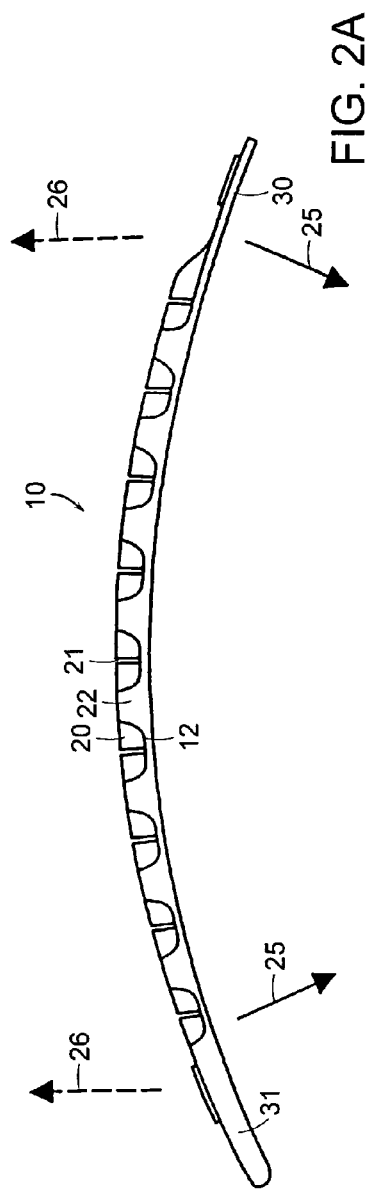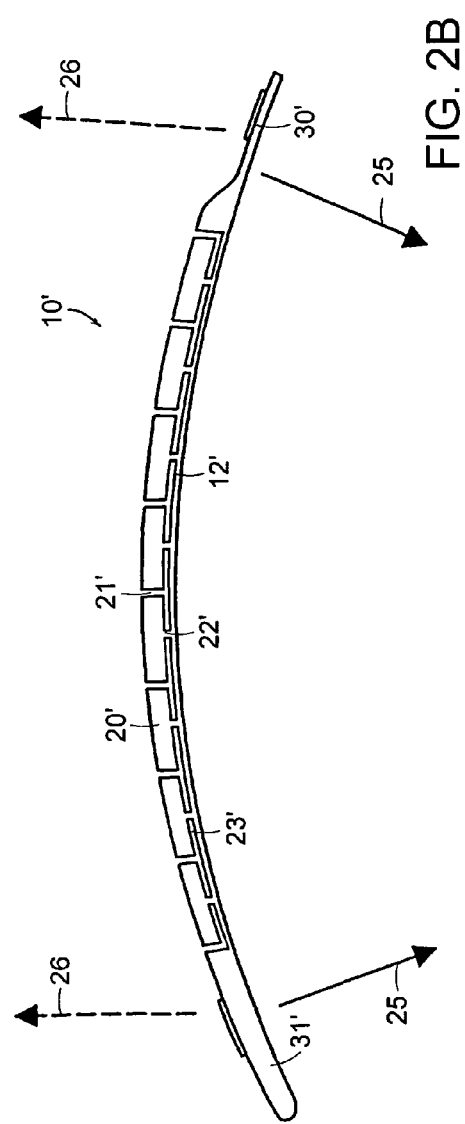

REINFORCING ELEMENT

CROSS-REFERENCE TO RELATED APPLICATION

This application incorporates by reference, and claims priority to and the benefit of, German patent application serial number 10350448.6, which was filed on Oct. 30, 2003.

TECHNICAL FIELD

The present invention relates generally to a reinforcing element for clothing, such as for a soccer goalkeeper glove.

BACKGROUND

A common risk attendant with sports activities is the hyperextension of joints, such as fingers, ankles, knees, etc. For example, a particular risk for a soccer goalkeeper is the hyperextension of individual fingers or the thumb. When the goalkeeper tries to deflect a ball with the extended hand, there is a risk that one or more fingers of the extended hand may be subjected to the complete impact of the ball and hyperextended. Strains, and in the worst case, fractures, are the consequence. Accordingly, specialized gloves have been developed with heavy cushioning to prevent such injuries.

A goalkeeper glove performs several functions. Apart from improving the grip on the inner side of the hand, a primary function of the glove is to protect the hand against substantial mechanical loads that occur when deflecting a sharply shot ball. In this respect, it is known to cushion the glove by damping the forces that occur during ball contact. Apart from this passive cushioning, it has also been known for several years to provide goalkeeper gloves and gloves for other sports with active reinforcing elements. Other sports where the joints are subjected to similar forces include snowboarding (where wrist injuries are common), football, skateboarding, etc.

These reinforcing elements allow a bending of the hand in a gripping direction, but block a bending of the extended hand in the opposite direction, i.e., into the direction of hyperextension. In the case of a goalkeeper glove, the extended hand, and more particularly the fingers and the thumb, are therefore actively supported by the glove when deflecting a sharply shot ball.

To obtain the desired mechanical properties, it is known to design the reinforcing element from at least two separately manufactured components. An example of such an element is shown in FIG. 7, the element indicated by reference numeral 1. A series of compression-proof bodies 2 are arranged on a completely flexible but elongation-free tension element 3 (e.g., a suitable foil, tape, or thin wire). As can be seen, the reinforcing element 1 can be easily folded into the direction of the solid arrows 4 (the first, or bending, direction), since the elongation-free foil, tape, or thin wire would not resist such a deformation. If, however, the reinforcing element 1 is extended, the compression-proof bodies 2 contact each other and prevent the reinforcing element 1 from exceeding the extended configuration into the direction of the dashed arrows 5 (the second, or hyperextension, direction).

If such a reinforcing element 1 is integrated into the backside of a glove for one or more fingers, the desired support against hyperextension is achieved by the described cooperation of the two components 2, 3. Examples of this design can be found in German Patent Nos. DE 3516545 A1, DE 19910799 C1, DE 10100848, DE 10010403 A1, and DE 10010404 A1, and in PCT Application No. WO 01/00052, the disclosures of which are herein incorporated by reference in their entireties. All of the disclosed reinforcing elements are made from an elongation-free tension element and a sequence of compression-proof bodies. As explicitly disclosed in those references, such a design allows a blocking action in the direction of hyperextension with a resistance-free movement in the gripping direction.

Another approach is described in German Patent No. DE 20113431 U1, the disclosure of which is herein incorporated by reference in its entirety. There, the reinforcing element comprises a plurality of hingedly connected units, with linked reinforcing elements, each having at one end a pivot and on the other end a corresponding bearing receptacle. The hinges are designed such that a rotation of two links with respect to each other is only possible in one direction. Starting from an extended configuration the sequence of links blocks any bending into the opposite direction.

Nearly all reinforcing elements for active protection against hyperextension known in the art require a complicated manufacture. In the constructions described above, the compression-proof bodies 2 attach to the tension element 3 by, for example, gluing, sewing, or guiding the tension element through openings in each individual compression-proof body 2. This process, however, is difficult to automate, thereby increasing the costs associated with such devices.

The same applies to the reinforcing elements made from a plurality of hingedly connected links, which must be separately manufactured and subsequently connected to each other. Since up to ten reinforcing elements may be required for a complete protection of the hand, this leads to substantial manufacturing efforts. Furthermore, the manual assembly of the reinforcing elements requires an exact quality control (for example, to verify whether the compression-proof bodies 2 are reliably anchored to the tension element 3 or whether all links have been correctly connected to each other). As a consequence of the related costs, gloves with active protection against hyperextension can until now only be found in the highest price segment and, therefore, are only usually purchased by professional or semi-professional users.

This is unfortunate, since the risk of sprains and fractures is particularly high with children, teenagers, and other non-professionals, not just in soccer, but in other sports as well. Goalkeeper gloves for these users, however, have until now not been equipped with active reinforcing elements for protection against hyperextension, simply because it is not economically feasible to incorporate into such gloves an expensive reinforcing element. In addition, the known constructions require a certain minimum size for reliable operation.

There have been attempts to avoid the complex manufacturing and assembly process accompanying multi-piece reinforcing elements by utilizing single-piece construction. One such attempt is disclosed in German Patent No. DE 297 05 586 U1, the disclosure of which is hereby incorporated by reference it its entirety, where a plurality of slits extend partially through a single piece of material, thereby forming a reinforcing element with thicker sections separated by thinner sections (located at the slits). The slits allow the reinforcing element to bend in a first direction and still provide a blocking interaction when the element is bent into a second direction.

Since the thicker portions of the reinforcing element are more resistant to bending, however, the bending in the first direction would be concentrated at locations where the material is thinnest (i.e., at the slits). This would limit the flexibility of the reinforcing element disclosed in the above-referenced German patent. As a result, the element may cause discomfort to the fingers and/or joints of the wearer, for example, when throwing or catching a ball, or when punching at a ball to deflect a shot. This would be particularly likely if the bending locations do not correspond exactly with the wearer's joints. Additionally, the concentration of bending forces may cause the element to weaken at those points of bending more quickly. This weakening would ultimately lead to premature failure and require replacement of the entire reinforcing element.

There is, therefore, a need to provide a reinforcing element for active protection against hyperextension that can be more easily and inexpensively manufactured than known constructions, but without weakening prematurely, and that can also be used for smaller glove sizes. Additionally, there is a need to provide a reinforcing element that can be used in a variety of sports equipment, to prevent injuries to joints, such as ankles, wrists, knees, the neck, etc.

SUMMARY OF THE INVENTION

This problem is solved by a reinforcing element for clothing, for example, a goalkeeper glove, having at least one elongate element and a plurality of blocking bodies. The blocking bodies are arranged in such a manner at the elongate element that the reinforcing element may bend into a first direction, and may block a bending into a second direction by a blocking contact of the blocking bodies, wherein the elongate element and the blocking bodies are provided together as a single piece.

As discussed above, the prior art teaches that a blocking interaction in one direction and a folding into the other direction can only be achieved by a combination of at least two separately manufactured components. The invention described herein is based at least in part on the realization that it is not a disadvantage if the reinforcing element provides some bending resistance in gripping direction. The elongate element according to the present invention keeps the glove, and thereby the hand, in a desired starting position. In the case of a goalkeeper glove, the hand is returned into the slightly extended natural configuration of the hand after each gripping action. In fact, this in itself is an advantage when the goalkeeper has to react to a surprise shot, since the hand is, from the beginning, almost extended and covers a maximum area when the arm is lifted.

Furthermore, the use of an elongate element instead of the fully flexible foils or tapes of tension elements known in the prior art allows the manufacture of all blocking bodies and the elongate element together as a single one-piece part. Simple manufacturing methods (for example, well-known forming techniques for plastic materials) allow the production of the complete reinforcing element by a single production step. As the manual assembly of each individual reinforcing element of a goalkeeper glove is no longer necessary, the manufacturing costs are reduced to such an extent that active protection against hyperextension can be integrated even into simpler, smaller, more inexpensive glove models.

In one aspect, the invention relates to a reinforcing element for an article of clothing. The reinforcing element includes at least one elongate element and a plurality of raised bodies aligned substantially longitudinally and integrally formed with the elongate element. The bodies define slits therebetween to allow bending of the reinforcing element in a first direction and limit bending of the reinforcing element in a second direction by blocking contact of the bodies. The bodies and the elongate element define a gap therebetween, the gap oriented substantially parallel with respect to the elongate element.

In one embodiment of the above aspect, the elongate element and the bodies are manufactured by injection molding of a single material in a single mold. In another embodiment, the bodies maintain a substantially uniform dimension upon the elongate element bending in the first direction. In yet another embodiment, the reinforcing element further includes at least one ridge connecting each body to the elongate element. In other embodiments of the above aspect, each body includes a side having a width, and each ridge has a width less than the width of the side of the body. Other embodiments of the above aspect include a second elongate element, wherein each body is connected by a first ridge to the first elongate element and by a second ridge to the second elongate element. The second elongate element can be substantially evenly spaced from the first elongate element.

In other embodiments of the above aspect, the elongate members have a contoured shape in an unloaded position, which may approximate the curvature of a finger. The elongate element of certain embodiments provides a restoring force when bent in the first direction. In still another embodiment, at least two of the bodies each have a respective facing surface, wherein the two facing surfaces are arranged substantially parallel and at least one of the two facing surfaces has a predetermined thickness greater than a thickness at an approximate center of the body. The thickness of the body determines a first point of blocking contact of the bodies, such as to determine an extension limit of the reinforcing element in the second direction. Other embodiments of the above aspect incorporate the reinforcing element into an article of clothing, such as a glove.

In another aspect, the invention relates to a reinforcing element for an article of clothing. The reinforcing element includes a first elongate element and a second elongate element spaced therefrom, each elongate element having an upper side. The reinforcing element includes a plurality of raised bodies that limit bending of the reinforcing element in one direction by blocking contact of the bodies. The reinforcing element includes a plurality of ridges, wherein each body is coupled to the upper side of the first elongate element by a first ridge and to the upper side of the second elongate element by a second ridge.

In certain embodiments, the reinforcing element forms a unitary structure. In other embodiments of the above aspect, the reinforcing element is flexible in a first direction, and the flexibility of the reinforcing element in the first direction is dependent upon a width of each ridge. Still other embodiments have a width of each ridge that is less than a width of at least one of the lateral side and the medial side of each body.

In still another aspect, the invention relates to a reinforcing element for an article of clothing. The reinforcing element can be defined by a predetermined flexibility in a first direction, and have at least one rail, a plurality of substantially aligned raised bodies, and a plurality of ridges. Each ridge has a predetermined width and connects the bodies to the at least one rail.

In certain embodiments, the rail, the bodies, and the ridges form a unitary component. Other embodiments of the above aspect include an upper side of the rail, wherein the ridges couple the bodies to the upper side of the rail. Each body may further include a medial side and a lateral side, wherein the widths of the ridges are less than a width of at least one of the lateral side and the medial side of at least one of the bodies. In other embodiments of the above aspect, the reinforcing element further includes a plurality of matching spaced rails.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 2A is a schematic side view of the reinforcing element of FIG. 1;

FIG. 2B is a schematic side view of an alternative embodiment of a reinforcing element in accordance with the invention;

DETAILED DESCRIPTION

In the following, an embodiment of the invention is described with reference to a reinforcing element for a goalkeeper glove. It is to be understood, however, that the present invention can also be used as a reinforcing element for other types of clothing, namely, sports equipment. For example, the invention is particularly well-suited for use in gloves for snowboarding, football, or other activities, where there exists a high risk of hyperextension of fingers and/or the thumb. The invention may also be utilized in work gloves, particularly those employed in industries where injuries to the hands are common, such as construction or heavy industry. Moreover, the reinforcing elements according to the invention may be used for protection of other parts of the body, for example as an active support element in other articles of sports equipment. The articles of sports equipment where such a reinforcing element can be used include but are not limited to sports shoes, gloves, shin guards, ankle braces, back braces, knee braces, elbow braces, neck braces, shoulder braces, and hip braces.

Figure 1:
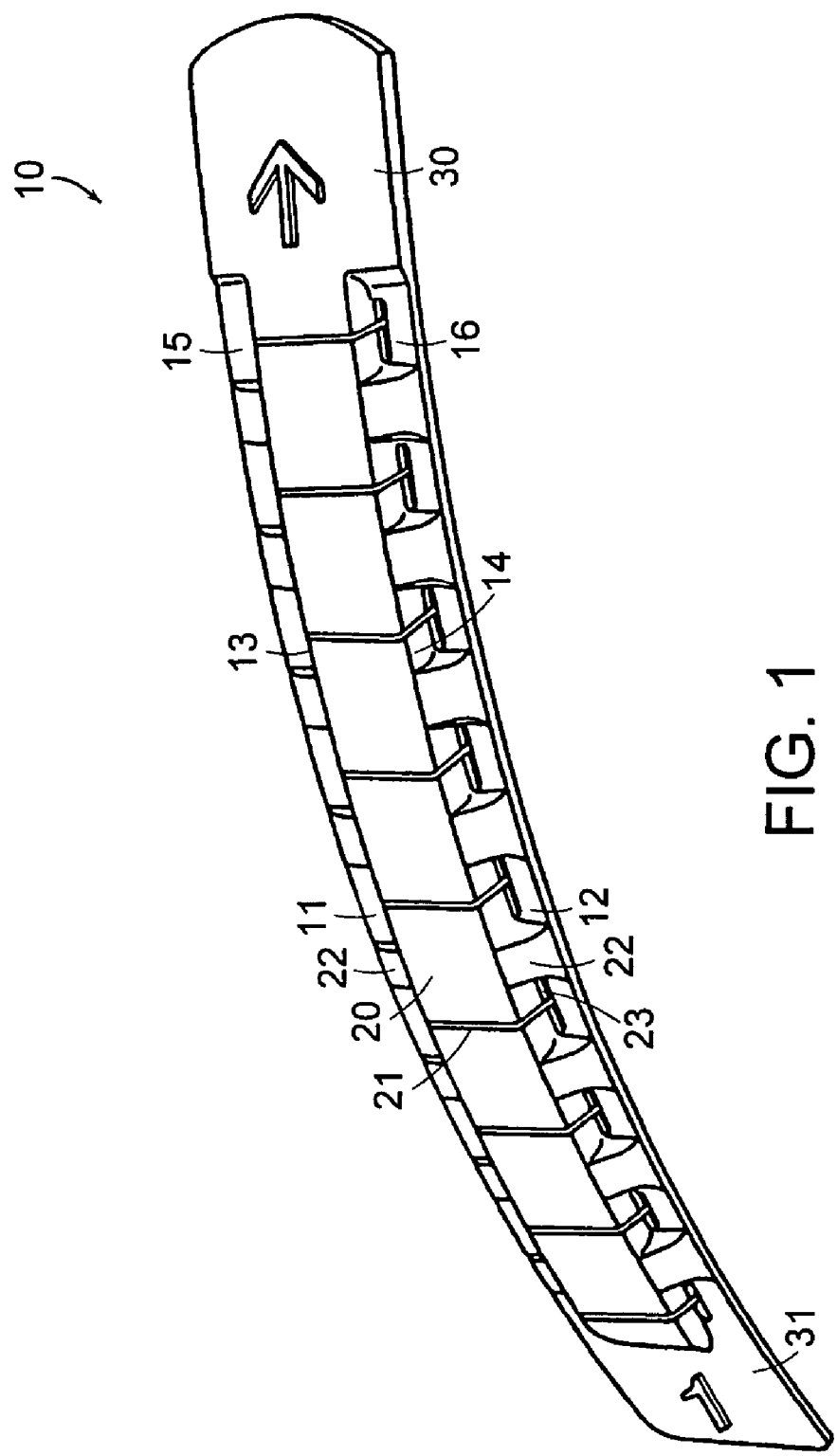
FIG. 1 is a schematic perspective view of one embodiment of a reinforcing element in accordance with the invention.

FIG. 1 shows a schematic perspective view of one embodiment of a reinforcing element 10. The reinforcing element 10 may be made as a one-piece part, the sides of which are two substantially aligned elongate elements 11, 12 that may be spaced substantially evenly or parallel along their lengths. In certain embodiments, the elongate elements 11, 12 are elastic strips or rails. A plurality of bodies 20 are substantially in alignment and are arranged between the two elements 11, 12 and spaced such that a thin slit 21 is provided between adjacent bodies 20. The number of bodies 20 may vary with the length of the reinforcing element 10. Each body 20 is connected via a projection or ridge 22 to the elements 11, 12. In one embodiment, the ridge 22 connects the medial side 13 of a body 20 to an upper side 15 of the first element 11. Similarly, another ridge 22 connects the lateral side 14 of the body 20 to an upper side 16 of the second element 12. Gaps or cut-outs 23 between the bodies 20 and the elongate elements 11, 12 are arranged on the two sides of the ridge 22 substantially parallel with respect to the elongate elements 11, 12. The cut-outs 23 effectively decouple the bodies 20 from the bending of the elongate elements 11, 12. This decoupling action allows the elongate elements 11, 12 to bend nearly uniformly along their entire lengths, thus distributing the associated forces evenly, without concentrating them at discrete points along the elements 11, 12, which leads to premature element weakening. Moreover, this uniform bending may be more comfortable for the wearer than prior art reinforcing elements that bend at discrete points. The size and shape of the cut-out 23 influences the bending properties of the reinforcing element 10. For example, larger cut-outs 23 may increase the flexibility of the elongate elements 11, 12 and, thus, increase the flexibility of the entire reinforcing element 10.

In the depicted embodiment, the attachment of each body 20 to the two elements 11, 12 is limited to the dimensions of the ridges 22. As a consequence, the bodies 20 maintain a substantially uniform shape and dimension under a bending of the elements 11, 12 in the direction of the solid arrows 25 (FIG. 2A) which depict a first, or bending, direction. The resistance of the reinforcing element 10 against such a bending is at least partially determined by the dimensions and the material of the elements 11, 12 on the sides. Therefore, when the one-piece part comprising the bodies 20 and the elongate elements 11, 12 are folded into gripping direction, it is essentially only the resistance of the elongate elements 11, 12 that has to be overcome. As a result, distinct unidirectional mechanical properties of the reinforcing element 10 are achieved in spite of its one-piece design, which allow a bending into a first direction and which provide a blocking effect into another direction.

Figure 4:
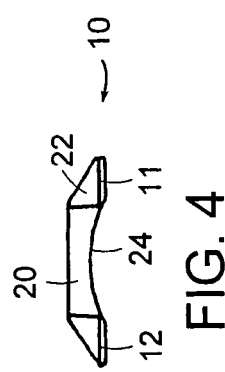
FIG. 4 is a schematic cross sectional view of the reinforcing element of FIG. 3 taken along the line 4-4.
Figure 5:
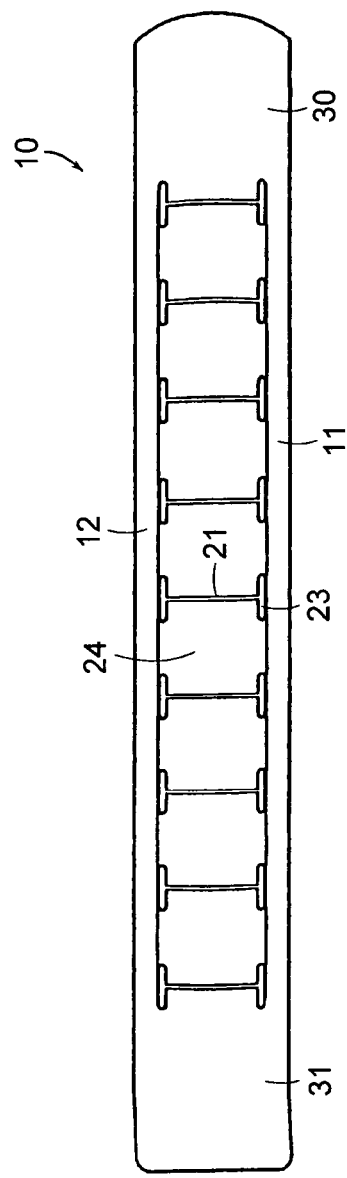
FIG. 5 is a schematic bottom view of the reinforcing element of FIG. 1.

The thinner the width of the ridges 22, the greater the decoupling between the bodies 20 and the elements 11, 12, thus allowing greater flexibility of the reinforcing element 10. In the depicted embodiment, each ridge 22 occupies approximately one third of the side surface of a body 20 and is arranged in its center. Other arrangements and sizes are possible, however. The tops of the ridges 22 are inclined to the side (as depicted in FIG. 4), so that the reinforcing element 10 has a profile that can be easily integrated into the backside of the glove behind a finger or into another article of sports equipment. Since the reinforcing elements are generally inserted into elongate pocket-shaped openings on sports equipment, it is desirable to reduce the size of projecting lateral edges to allow for easy insertion. Also, by reducing the size of the projecting lateral edges, the risk of injuries caused by the edges is reduced.

In FIG. 2A, the dashed arrows 26 indicate the second, or hyperextension, direction. When moved into this direction, the bodies 20 contact each other with their adjacent front sides 29 (FIGS. 6A and 6B) and block any further bending in this direction. The bodies 20 may be shaped in a manner that a blocking contact is obtained already before the extended position is reached.

Another embodiment of the reinforcing element 10' is depicted in FIG. 2B. In this embodiment, a number of bodies 20' are arranged above a single strip 12'. The bodies 20' are spaced in a manner similar to those depicted in the embodiment of the reinforcing element 10 in FIG. 2A, such that there exists a slit 21' between adjacent bodies 20', and a cut-out 23' between each body 20' and the strip 12'. In the depicted reinforcing element 10', each body 20' is joined to the strip 12' by a ridge 22'. The ridge 22' may extend the full width of the body 20', or only a part thereof. Alternatively, instead of a single ridge 22' connecting each body 20' to the strip 12', a plurality of ridges, arranged in a substantially linear orientation along the width of the strip 12' may connect each body 20' to the strip 12'. In another embodiment, the bodies 20' are joined to the side of the strip 12'. The reinforcing element 10' depicted in FIG. 2B also includes an insertion area 30' and a flat region 31'. The reinforcing element 10' functions similarly to the embodiment depicted in FIG. 2A when moved in the directions depicted by arrows 25, 26, as described below.

Figure 6A:
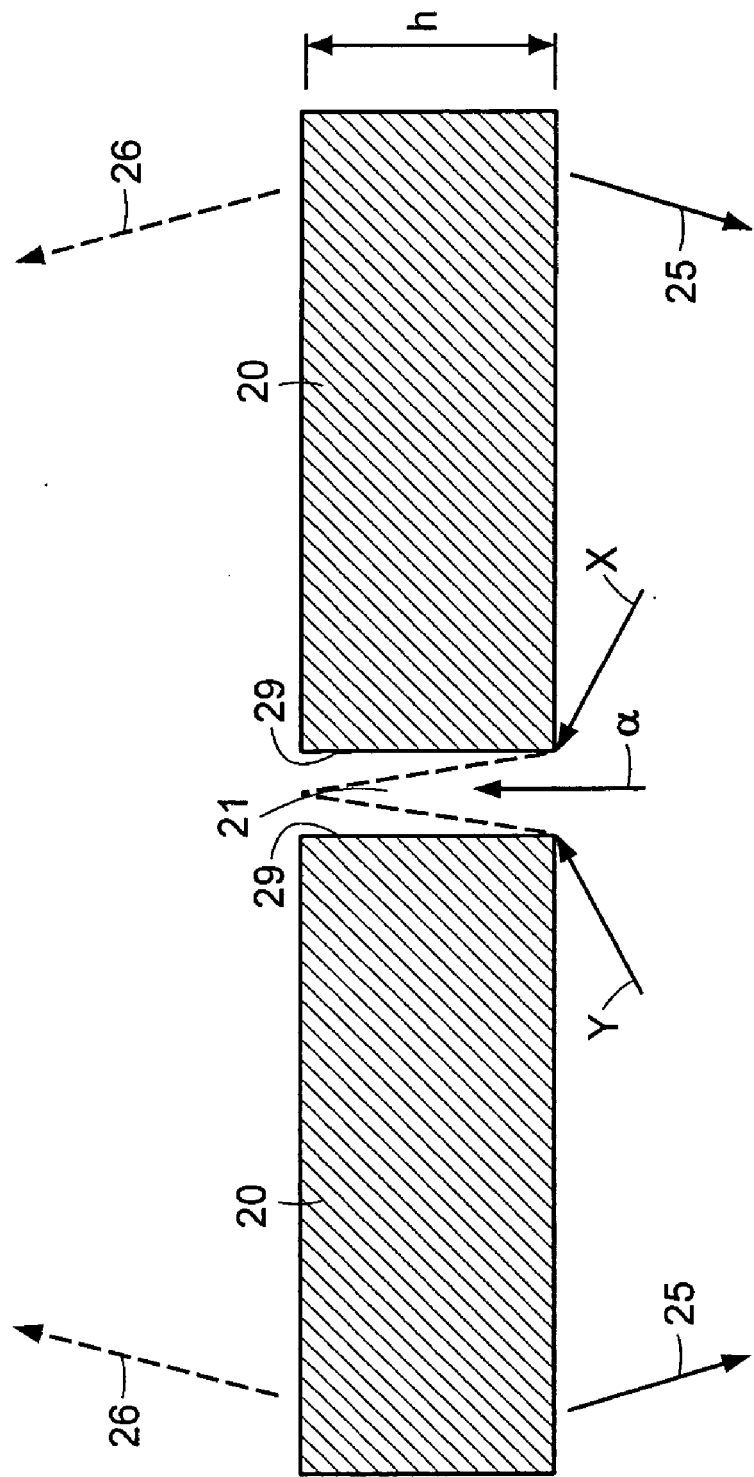
FIG. 6A is an enlarged schematic side view of two bodies in accordance with one embodiment of the invention.
Figure 6B:
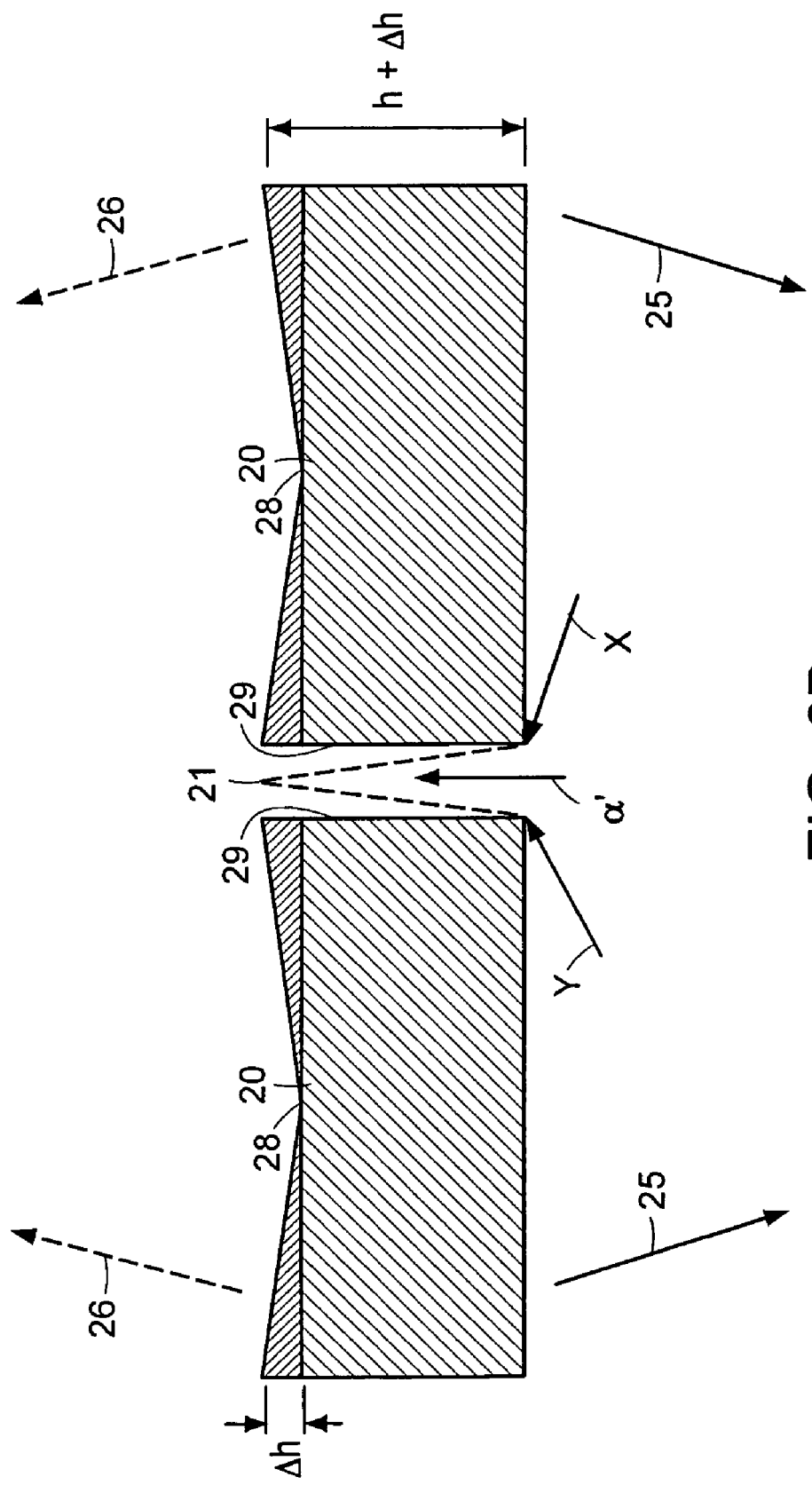
FIG. 6B is an enlarged schematic side view of two bodies in accordance with an alternative embodiment of the invention.
Figure 7:
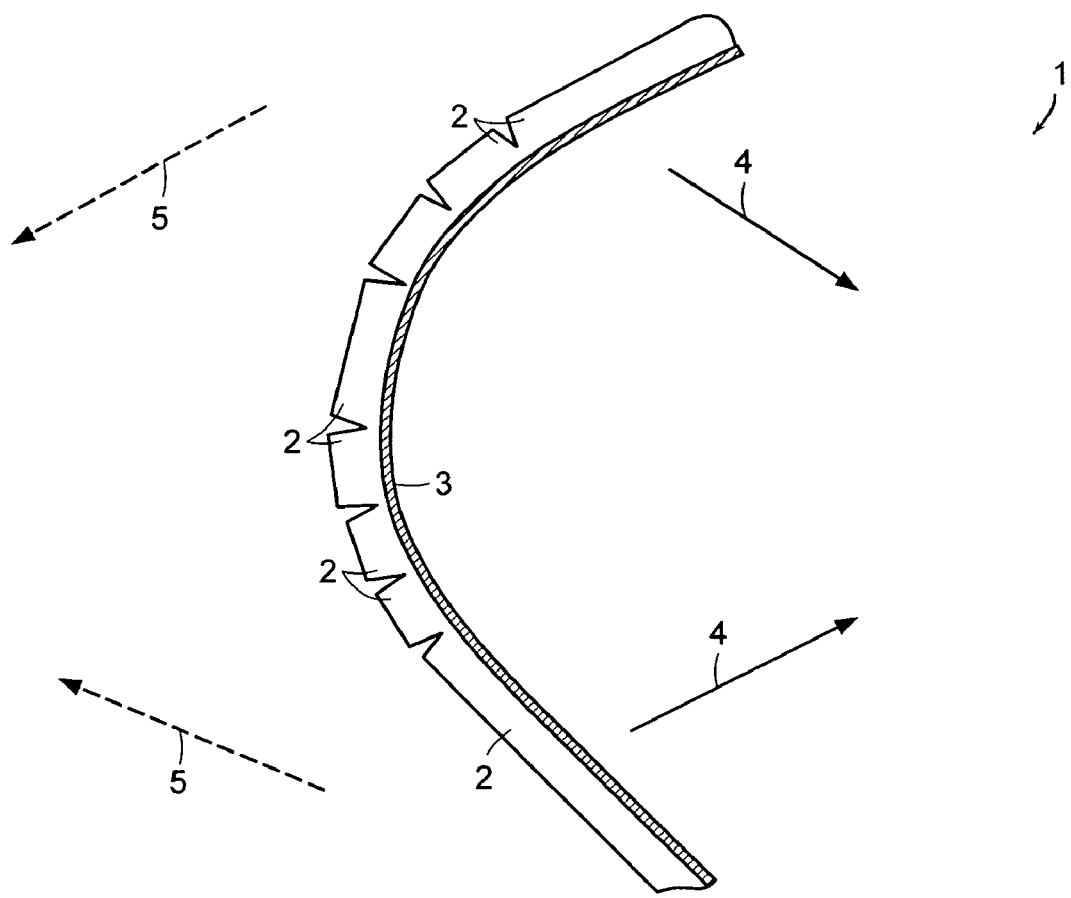
FIG. 7 a schematic side view of a prior art reinforcing element.

The comparison of the enlarged views of two adjacent bodies 20 in FIGS. 6A and 6B shows schematically how their blocking interaction or contact can be further adjusted. It is to be noted that FIGS. 6A and 6B are not to scale, as the width and length of the bodies may vary depending on predetermined factors such as use, weight or size restrictions, costs, etc. The bodies 20 depicted in FIGS. 6A and 6B serve only to illustrate one possible adjustment principle. The blocking angle $\alpha$ determines when the bodies 20 start to limit any further backwards bending or bending in the hyperextension direction 26. If $\alpha=0°$, the blocking contact starts exactly in the extended orientation of the reinforcing element. If $\alpha>0°$, the blocking interaction starts in a slightly hyperextended orientation.

For manufacturing reasons, it may be preferred to have a slit 21 of a certain thickness (the fixed distance between the points X and Y in FIGS. 6A, 6B), which leads inevitably to an angle $\alpha>0°$, as depicted in FIG. 6A. However, if the height h of the contacting facing surfaces 29 of the blocking bodies 20 is increased by an amount $\Delta h$, as shown in FIG. 6B, the value of the blocking angle is reduced ($\alpha'<\alpha$), so that blocking contact begins earlier, even though the slit 21 width is the same. The greater height ($h+\Delta h$) of the contacting front surfaces 29 can, for example, be achieved by providing the bodies 20 with a linearly increasing thickness from the center 28 to the facing surface 29, as shown in the cross-section of FIG. 6B. By increasing or decreasing the height h of the facing surfaces 29, the first point of blocking contact between the bodies 20 can be adjusted, thereby determining the extension limit of the reinforcing element 10 in the hyperextension direction 26. The advantage of this shape is that the overall thickness of the reinforcing element 10 is only locally increased, so a glove that utilizes such a reinforcing element 10 does not become too bulky. Other shapes are contemplated, such as bodies 20 with concave top sides or bodies where the tops of the facing sides 29 are pitched or inclined toward or away from each other, instead of substantially parallel as depicted.

If the reinforcing element 10 described above is integrated into a glove so that the bending direction of the solid arrows 25 in FIG. 2A corresponds to the natural gripping direction of the hand, a protection against hyperextension of single fingers, the thumb or—depending on the arrangement and the size of the reinforcing element 10—the wrist is achieved. For a better adaptation to the backside of a finger or of the thumb, the lower sides 24 of the blocking bodies 20 can be curved, as shown in the cross-section of FIG. 4. This curvature mimics the natural curve of the finger.

Apart from the dimensions of the ridges 22, also the size of the cut-outs 23 on the sides determine the bending properties and the resistance of the reinforcing element 10 against hyperextension. As a consequence of utilizing wider cut-outs 23, the width of the ridges 14, 16 and/or lengths of the bodies 20 are decreased. In the first case, narrower ridges 22 reduce the resistance to bending, whereas shorter bodies 20 reduce stability in the hyperextension direction 26. The wider the cut-outs 23, the smaller the lateral bending strips 11, 12 or the central bodies 20, if the overall width of the reinforcing element 10 is kept constant. In the first case, it is primarily the bending resistance in the gripping direction that is reduced, whereas thinner bodies 20 lead to a reduced stability in the direction of hyperextension 26.

Figure 3:
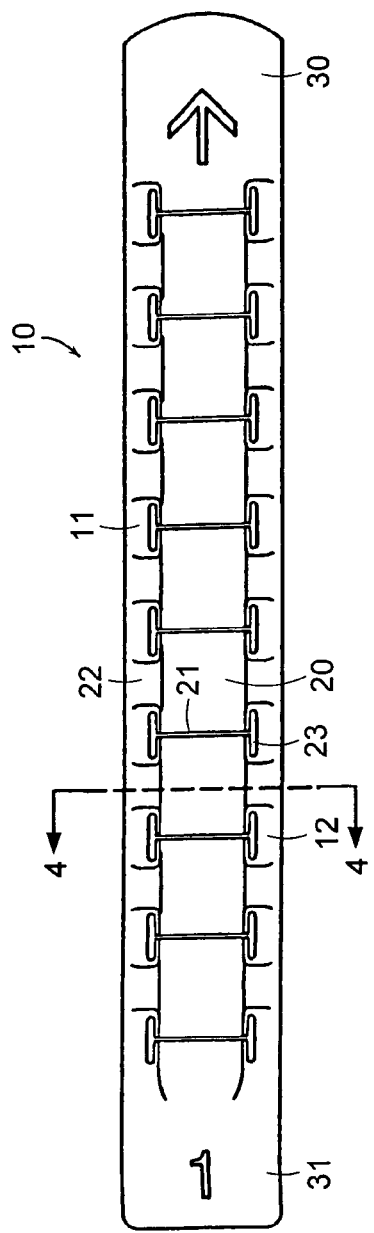
FIG. 3 is a schematic plan view of the reinforcing element of FIG. 1.

As depicted in FIG. 1, at one terminal end, the reinforcing element 10 forms an insertion area 30, which may be flattened and rounded on its side to facilitate the insertion into a receptacle, such as a pocket on a backside of a glove. In the same manner, the last body 20 on the same terminal end forms a flat region 31, which facilitates the holding of the reinforcing element 10 for insertion into the backside of a glove. Furthermore, the flat end section 31 serves to transmit the forces caused by the support of a finger into the backside of the hand. The insertion area 30, as well as the flat end section 31, can further be used to receive assembly instructions, for example, the direction of insertion and the number of a reinforcing element 10, which is to be arranged in a certain position in the glove. This is schematically indicated in FIGS. 1 and 3 with the arrow and the numeral "1." Additionally, the user may adjust the support properties of the glove by exchanging individual reinforcing elements 10 or by arranging reinforcing elements 10 only behind desired fingers. All these adaptations are facilitated by information about an individual reinforcing element 10, which can be provided on the flat end section 31.

The depicted reinforcing element 10 is manufactured in a single mold as a continuous, one-piece, unitary component. The element 10 may be manufactured from thermoplastic materials, which can be cost-efficiently and precisely processed by injection molding. The element 10 may also be molded in discreet parts, then joined or otherwise fused together. Other exemplary techniques for forming plastic materials, such as deep drawing, vacuum forming or other techniques that facilitate the manufacture of highly individualized reinforcing elements are contemplated. Additionally, 3D-printing or stereolithography may be utilized. In any case, the design of the reinforcing element 10 of the present invention eliminates the need for costly manual assembly of the elements 11, 12 and the bodies 20.

Examples of preferred plastic materials are polypropylene (PP) for reinforcing elements 10, which are only subjected to limited loads (for example for goalkeeper gloves of children and teenagers) and polyoximethylene (POM) for goalkeeper gloves subjected to high loads, such as those encountered by professionals. In this context, it is conceivable to arrange different reinforcing elements behind different fingers of the hand within the glove, for example, to provide a greater protection for the small finger against hyperextension or to obtain a particularly low resistance in gripping direction (solid arrows 25 in FIGS. 2A and 2B) for weaker fingers. This may be achieved, for example, by using a different material or by variations of the thickness of the elements 11, 12 and the ridges 22 and/or the cut-outs 23. In any case, the injection molding of the reinforcing element 10 as a single piece facilitates adaptations of the size and/or modifications of the construction. In contrast to the prior art, where any modification of the reinforcing element requires new instructions to the production personnel to ensure a sufficient quality of the manually assembled components, the reinforcing element 10 described in this invention requires only an adaptation of the injection molding tool.

The tool for injection molding defines, apart from the already discussed details of the reinforcing element, the initial contoured shape of the element 10 in the absence of any external force (i.e., when the reinforcing element 10 is not being bent, or is in an otherwise unloaded position). This initial contoured shape corresponds to the natural shape of the body part being protected, in this case, the curvature of a finger in a relaxed state. The closing of the hand when catching a ball, for example, leads to a bending of the elements 11, 12 and, thereby, to an elastic restoring force, which brings the hand back into its natural initial configuration. The reinforcing element 10 therefore actively supports the actual course of movements of the hand. Furthermore, the slight curvature in the natural initial configuration of the hand is advantageous when the goalkeeper throws up his arms to deflect a surprise shot, since the hand is already in an almost extended configuration and provides therefore the greatest range for the goalkeeper to deflect the ball. As a result, the reinforcing element 10 of the present invention provides improved functional properties, while substantially reducing burdensome manufacturing considerations.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A reinforcing element for an article of clothing, the reinforcing element comprising:
    at least one elongate element; and
    a plurality of raised bodies aligned substantially longitudinally and integrally formed with the at least one elongate element, wherein the plurality of raised bodies define slits therebetween to allow bending of the reinforcing element in a first direction and limit bending of the reinforcing element in a second direction by blocking contact of the plurality of raised bodies, each of the plurality of raised bodies and the at least one elongate element defining a gap therebetween, the gap oriented substantially parallel with respect to a longitudinal axis of the at least one elongate element.

2. The reinforcing element according to claim 1, wherein the at least one elongate element and the plurality of raised bodies are manufactured by injection molding of a single material in a single mold.

3. The reinforcing element according to claim 1, wherein the plurality of raised bodies maintain a substantially uniform dimension upon the at least one elongate element bending in the first direction.

4. The reinforcing element according to claim 1, further comprising a plurality of ridges connecting each of the plurality of raised bodies to the at least one elongate element, wherein each of the plurality of raised bodies comprises a side having a width, and wherein each of the plurality of ridges has a width less than the width of the side of each of the plurality of raised bodies.

5. The reinforcing element according to claim 1, wherein the at least one elongate element comprises a first elongate element and a second elongate element, wherein each of the plurality of raised bodies is connected by a first ridge to the first elongate element and by a second ridge to the second elongate element.

6. The reinforcing element according to claim 5, wherein the second elongate element is substantially evenly spaced from the first elongate element.

7. The reinforcing element according to claim 6, wherein the first elongate element and the second elongate element comprise a contoured shape when in an unloaded position.

8. The reinforcing element according to claim 7, wherein the contoured shape approximates a curvature of a finger.

9. The reinforcing element according to claim 1, wherein the at least one elongate element provides a restoring force when bent in the first direction.

10. The reinforcing element according to claim 1, wherein at least two of the plurality of raised bodies each comprise a respective facing surface, wherein the two facing surfaces are arranged substantially parallel, and wherein at least one of the two facing surfaces has a predetermined thickness greater than a thickness at an approximate center of each of the at least two of the plurality of raised bodies.

11. The reinforcing element according to claim 10, wherein the thickness of each of the at least two of the plurality of raised bodies determines a first point of blocking contact of the at least two of the plurality of raised bodies such as to determine an extension limit of the reinforcing element in the second direction.

12. An article of clothing comprising the reinforcing element according to claim 1.

13. The article according to claim 12, wherein the article comprises a glove.

14. A reinforcing element for an article of clothing, the reinforcing element comprising: a first elongate element and a second elongate element spaced therefrom, each of the first elongate element and the second elongate element comprising an upper side; a plurality of raised bodies that limit bending of the reinforcing element in one direction by blocking contact of the plurality of raised bodies; and a plurality of ridges, wherein each of the plurality of raised bodies is coupled to the upper side of the first elongate element by a first ridge and to the upper side of the second elongate element by a second ridge.

15. The reinforcing element of claim 14, wherein the reinforcing element forms a unitary structure.

16. The reinforcing element according to claim 14, wherein the reinforcing element is flexible in a first direction.

17. The reinforcing element according to claim 16, wherein flexibility of the reinforcing element in the first direction is dependent upon a width of each of the plurality of ridges.

18. The reinforcing element according to claim 14, wherein a width of each of the plurality of ridges is less than a width of at least one of a lateral side and a medial side of each of the plurality of raised bodies.

19. A reinforcing element for an article of clothing, the reinforcing element comprising:
    at least one elongate element;
    a plurality of raised bodies aligned substantially longitudinally and integrally formed with the at least one elongate element, wherein the plurality of raised bodies define slits therebetween to allow bending of the reinforcing element in a first direction and limit bending of the reinforcing element in a second direction by blocking contact of the plurality of raised bodies, each of the plurality of raised bodies and the at least one elongate element defining a gap therebetween, the gap oriented substantially parallel with respect to the at least one elongate element; and
    at least two ridges connecting each of the plurality of raised bodies to the at least one elongate element.

* * * * *